(12) United States Patent
Qi et al.

(10) Patent No.: US 9,456,059 B2
(45) Date of Patent: Sep. 27, 2016

(54) METHODS AND ARRANGEMENTS FOR EXTENSION FRAMES IN WIRELESS NETWORKS

(75) Inventors: Emily H. Qi, Gig Harbor, WA (US);
Minyoung Park, Portland, OR (US);
Thomas J. Kenney, Portland, OR (US);
Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/977,705

(22) PCT Filed: Dec. 31, 2011

(86) PCT No.: PCT/US2011/068261
§ 371 (c)(1),
(2), (4) Date: Mar. 19, 2014

(87) PCT Pub. No.: WO2013/052078
PCT Pub. Date: Apr. 11, 2013

(65) Prior Publication Data
US 2014/0198805 A1    Jul. 17, 2014

Related U.S. Application Data

(60) Provisional application No. 61/544,902, filed on Oct. 7, 2011.

(51) Int. Cl.
*H04L 29/06* (2006.01)
*H04B 7/26* (2006.01)
*H04W 52/02* (2009.01)

(52) U.S. Cl.
CPC ............. *H04L 69/22* (2013.01); *H04B 7/2656* (2013.01); *H04W 52/0216* (2013.01)

(58) Field of Classification Search
CPC .............................. H04L 29/06; H04L 69/22
See application file for complete search history.

(56) References Cited

U.S. PATENT DOCUMENTS

2008/0270588 A1* 10/2008 Sultan ................. H04L 12/4641
709/223
2010/0246600 A1    9/2010 Das et al.
(Continued)

FOREIGN PATENT DOCUMENTS

| CN | 101300785 A | 11/2008 |
| KR | 10-2006-0080542 A | 7/2006 |
| WO | 2013/052078 A1 | 4/2013 |

OTHER PUBLICATIONS

International Search Report and Written Opinion received for PCT Patent Application No. PCT/US2011/068261, mailed on Oct. 30, 2012, 9 Pages.
International Preliminary Report on Patentability and Written Opinion received for PCT Patent Application No. PCT/US2011/068261, mailed on Apr. 17, 2014, 5 Pages.

(Continued)

*Primary Examiner* — Feben M Haile
(74) *Attorney, Agent, or Firm* — Schubert Law Group PLLC

(57) ABSTRACT

Embodiments provide a frame extension to generate short frames with short medium access control (MAC) headers to facilitate transmissions for wireless communications devices. Many embodiments comprise MAC sublayer logic to build short frames. In some embodiments, the MAC sublayer may determine a short MAC header comprising a type field indicative of an extension frame; a subtype indicative of a short management, data, or control frame; and a frame extension indicative of a particular type of short management, data, or control frame. Some embodiments may store the short frames or short frame formats in memory, in logic, or in another manner that facilitates transmission of the short frames. Some embodiments may receive and detect communications with the short frames. Further embodiments may generate and transmit a communication with the short frames.

21 Claims, 6 Drawing Sheets

| FRAME TYPE AND SUBTYPE ASSIGNMENTS TABLE | | 1200 | | |
|---|---|---|---|---|
| TYPE VALUE B3 B2 | DESCRIPTION | SUBTYPE VALUE B7 B6 B5 B4 | SHORT FRAME EXTENSION VALUE | DESCRIPTION |
| 11 | EXTENSION | 0010 | 0000 TO 1111 | SHORT MANAGEMENT FRAMES |
| 11 | EXTENSION | 0011 | 0000 TO 1111 | SHORT DATA FRAMES |
| 11 | EXTENSION | 0100 | 0000 TO 1111 | SHORT CONTROL FRAMES |

(56) References Cited

U.S. PATENT DOCUMENTS

2011/0069688 A1* 3/2011 Zhang et al. .............. 370/338
2011/0149842 A1* 6/2011 Cordeiro .................... 370/328
2011/0149850 A1   6/2011 Sashihara
2011/0246600 A1  10/2011 Kageyama et al.

OTHER PUBLICATIONS

Office Action received for Chinese Patent Application No. 201180074616.8, mailed on Mar. 3, 2016, 8 pages of Chinese Office Action.

* cited by examiner

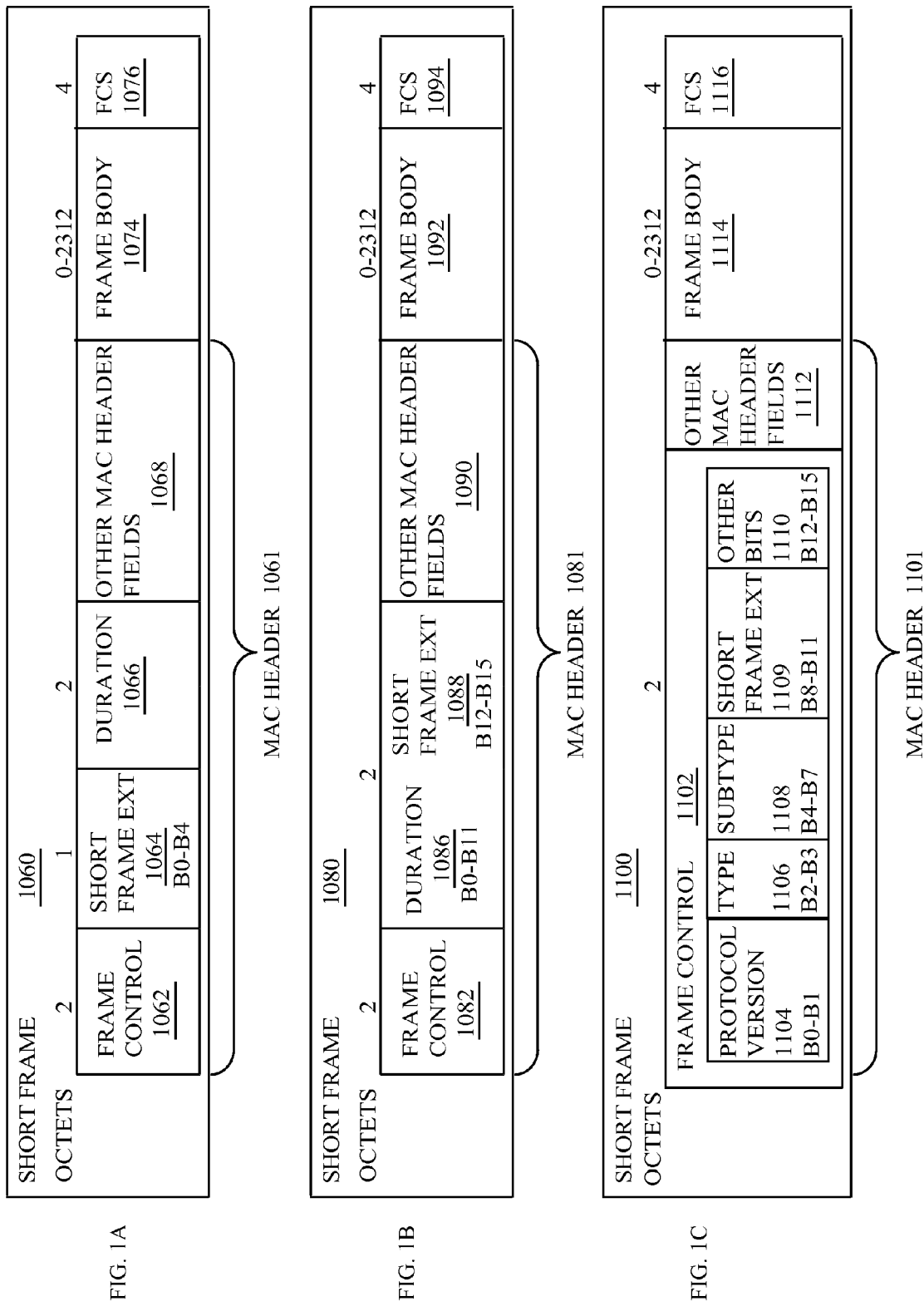

FIG. 1D

FRAME TYPE AND SUBTYPE ASSIGNMENTS TABLE 1200

| TYPE VALUE B3 B2 | DESCRIPTION | SUBTYPE VALUE B7 B6 B5 B4 | SHORT FRAME EXTENSION VALUE | DESCRIPTION |
|---|---|---|---|---|
| 11 | EXTENSION | 0010 | 0000 TO 1111 | SHORT MANAGEMENT FRAMES |
| 11 | EXTENSION | 0011 | 0000 TO 1111 | SHORT DATA FRAMES |
| 11 | EXTENSION | 0100 | 0000 TO 1111 | SHORT CONTROL FRAMES |

FIG. 1E

SHORT FRAME EXTENSION ASSIGNMENTS TABLE 1300

| TYPE VALUE B3 B2 | DESCRIPTION | SUBTYPE VALUE B7 B6 B5 B4 | SHORT FRAME EXTENSION VALUE | DESCRIPTION |
|---|---|---|---|---|
| 11 | EXTENSION | 0011 | 0000 | SHORT DATA |
| 11 | EXTENSION | 0011 | 0001 | SHORT DATA+CF-ACK |
| 11 | EXTENSION | 0011 | 0010 | SHORT DATA+CF-POLL |
| 11 | EXTENSION | 0011 | 0011 | SHORT DATA CF-ACK+CF-POLL |
| 11 | EXTENSION | 0011 | 0100 | SHORT NULL |
| 11 | EXTENSION | 0011 | 0101 | SHORT CF-ACK (NO DATA) |
| 11 | EXTENSION | 0011 | 0110 | SHORT CF-POLL (NO DATA) |
| 11 | EXTENSION | 0011 | 0111 | SHORT CF-ACK+CF-POLL (NO DATA) |
| 11 | EXTENSION | 0011 | 1000 TO 1111 | TO BE DEFINED (OR RESERVED) |

METHODS AND ARRANGEMENTS FOR EXTENSION FRAMES IN WIRELESS NETWORKS

BACKGROUND

Embodiments are in the field of wireless communications. More particularly, embodiments are in the field of communications protocols between wireless transmitters and receivers.

BRIEF DESCRIPTION OF THE DRAWINGS

FIG. 1A depicts an embodiment of a short frame with a short frame extension for establishing communications between wireless communication devices;

FIG. 1B depicts an alternative embodiment of a short frame with a short frame extension for establishing communications between wireless communication devices;

FIG. 1C depicts another alternative embodiment of a short frame with a short frame extension for establishing communications between wireless communication devices;

FIG. 1D depicts an embodiment of a table for type and subtype assignments of the short frame with the short frame extension such as the short frames illustrated in FIGS. 1A-C;

FIG. 1E depicts an embodiment of a table for type, subtype, and frame extension values of the short frame with the short frame extension such as the short frames illustrated in FIGS. 1A-C;

DETAILED DESCRIPTION OF EMBODIMENTS

Figure 1:
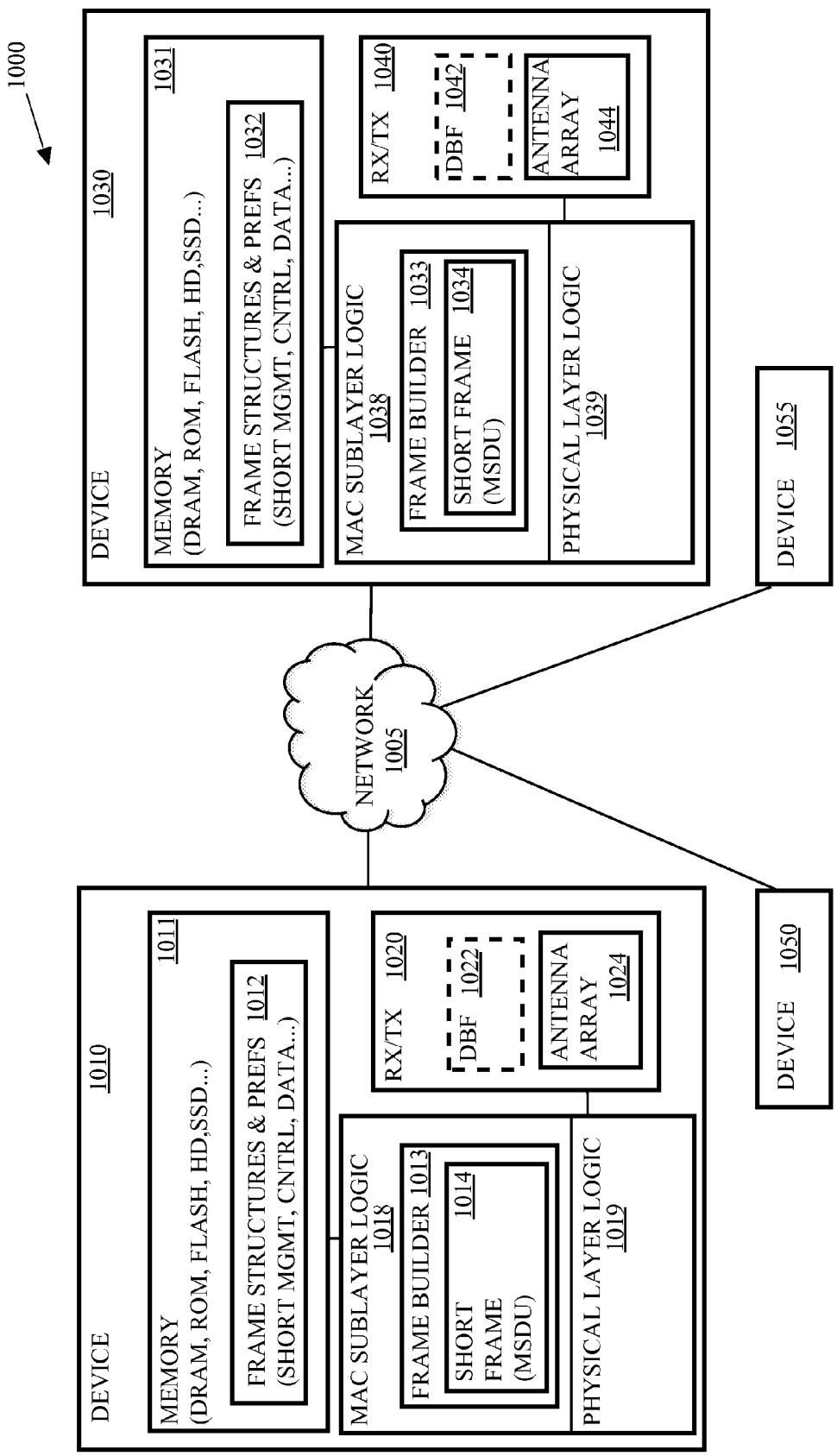
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments provide a frame extension to generate frames with short medium access control (MAC) headers to facilitate transmissions for wireless communications devices. Many embodiments comprise MAC sublayer logic to build frames comprising the short MAC headers for a first communications device. In many embodiments, the MAC sublayer logic may determine a frame with a short MAC header based upon an extension frame format stored in memory. In some embodiments, the MAC sublayer logic may determine a short MAC header comprising a type field indicative of an extension frame; a subtype field indicative of a short management, data, or control frame; and a short frame extension field indicative of a particular type of short management, data, or control frame. Embodiments may determine and transmit and/or receive and interpret short frames.

Some embodiments implement a 1 Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest physical layer (PHY) rate is used for beacon and control frame transmissions. Although lowering the data rate may increase the transmission range, it takes much longer time to transmit a packet. According to one embodiment, the efficiency of the protocol is improved by reducing MAC headers of the packets to be short MAC headers, which can enable small battery-powered wireless devices (e.g., sensors) to use Wi-Fi to connect to the Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between Systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

Initially, the communications device 1030 may receive a short frame from communications device 1010. The short frame may be a frame with a short MAC header that is identified as an extension type frame and, in the current communication, a short management frame such as a short beacon frame. Thereafter, the communications device 1030 may transmit a short management frame such as a short association request frame to associate with communications device 1010. The communications device 1010 may transmit a short management frame such as a short association response frame to associate the communications device 1030 with the communications device 1010.

Once the communications device 1030 associates with the communications device 1010, the communications device 1030 may periodically transmit short data frames to the communications device 1010. The communications device 1030 may also periodically receive short beacon frames from the communications device 1010 of the metering substation to transmit data related to water usage.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and Media Access Control (MAC) sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the short frames and/or the short frame structures, or portions thereof. Furthermore, the memory 1011 and 1031 may comprise data to relate values of the type, subtype, and short extension fields with the particular type of management, data, and control frames. For example, the memory may comprise an indication of a value for an extension frame type as 11, a data frame subtype 0011, and an indication of a particular type of data frame such as a short data, contention free pollable (Short Data+CF-Poll) frame as 0010 or a short contention free acknowledgeable, contention free pollable (Short+CF-Ack+CF-Poll (no data)) frame as 0111. FIG. 1D illustrates an embodiment of a table 1100 of type and subtype value assignments for management, data, and control frames. And FIG. 1E illustrates an embodiment of a table 1200 of short frame extension values. Note that these tables include values that are illustrative so embodiments may use these values and/or other values for the assignments of the type, subtype, and short extension fields.

The MAC sublayer logic 1018, 1038 may comprise logic to implement functionality of the MAC sublayer of the data link layer of the communications device 1010, 1030. The MAC sublayer logic 1018, 1038 may generate the frames such as short management frames, short data frames, and short control frames, and the physical layer logic 1019, 1039 may generate physical layer protocol data units (PPDUs) based upon the frames. More specifically, the frame builders 1013 and 1033 may generate short frames and the data unit builders of the physical layer logic 1019, 1039 may encapsulate the short frames with preambles to generate PPDUs for transmission via a physical layer device such as the transceivers (RX/TX) 1020 and 1040.

The short frame 1014, also referred to as MAC layer Protocol Data Units (MPDUs), may comprise a management frame. For example, frame builder 1013 may generate a management frame such as the short beacon frame to identify the communications device 1010 as having capabilities such as supported data rates, privacy settings, quality of service support (QoS), power saving features, crosssupport, and a service set identification (SSID) of the network to identify the network to the communications device 1030.

The MAC sublayer logic 1018 may generate the short frame 1014 with a type field value set as 11, a subtype field value set as 0010, and a short extension field value set as 0101 to identify the frame as a short beacon frame. In some embodiments, the MAC sublayer logic 1018 may insert the short extension field value as a field immediately following the frame control field in the MAC header of the frame. In other embodiments, the MAC sublayer logic may insert the short extension field value in bits B12 through B15 of the duration field in the MAC header of the short frame 1014. In further embodiments, the MAC sublayer logic 1018 may insert the value of the short extension field in bits B8-B11 of the frame control field of the MAC header.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIG. 1A depicts an embodiment of a short frame 1060 for communications between wireless communication devices such as communications devices 1010, 1030, 1050, and 1055 in FIG. 1. The short frame 1060 may comprise a frame control field 1062, a short frame extension field 1064, a duration field 1066, other MAC header fields 1068, a frame body 1074, and a frame check sequence (FCS) field 1076. The MAC header 1061 may comprise the frame control field 1062, the short frame extension field 1064, the duration field 1066, and other MAC header fields 1068. The frame control field 1062 may be two octets and may identify the type and subtype of the frame such as an extension type and short frame subtype. The short frame extension field 1064 may be 1 octet and may include a value to identify a particular management type frame, data type frame, or control type frame. FIG. 1D comprises a table 1200 to illustrate examples of values for the type and subtype fields, as well as ranges of values for the short extension fields for management, data, and control type frames.

The MAC header 1061 of short frame 1060 may also comprise a duration field 1066 that is 2 octets and may comprise a duration such as a network allocation vector value. After the duration field 1066, the MAC header 1061 may comprise other MAC header fields 1068. The other MAC header fields 1068 may comprise, for example, one or more address fields, identification fields, control fields, or the like.

In some embodiments, such as embodiments of short data frames, the short frame 1060 may comprise a frame body 1074. The frame body 1074 may be a variable number of octets and may include data elements, control elements, or parameters and capabilities.

In many embodiments, the short frame 1060 may comprise a frame check sequence (FCS) field 1076. The FCS field 1076 may be four octets and may include extra checksum characters added to the short frame 1060 for error detection and correction.

FIG. 1B illustrates an alternative embodiment of a short frame 1080. The short frame 1080 may a MAC header 1081, a frame body 1092, and an FCS 1094. The MAC header 1081 may comprise a frame control field 1082, a duration field 1084, and other MAC header fields 1090. The frame control field 1082 may be two octets and may identify the type and subtype of the frame such as an extension type and short frame subtype.

The duration field 1084 may be 2 octets and may comprise a duration field 1086 value such as a network allocation vector value or an association identification (AID) that is one octet and is at bits B0-B11. The duration value may be truncated by utilizing an eighth microsecond time unit instead of the typical one microsecond time unit. The AID value may be truncated from 13 bits to 12 bits. The duration field 1084 may also comprise a short frame extension field 1088 that is 1 octet, resides at bits B12-15, and may include a value to identify a particular management type frame, data type frame, or control type frame such as the type, subtype, and short frame extension values shown in FIGS. 1D-E in tables 1200 and 1300.

The MAC header 1081 may also comprise other MAC header fields 1090 and an FCS 1094. Note that the number of octets and the number of bits illustrated in FIGS. 1A-C describe the lengths of the fields in some embodiments. Other embodiments may implement different length fields.

FIG. 1C depicts another alternative embodiment of a short frame 1100 with a short frame extension for establishing communications between wireless communication devices. The short frame 1100 may comprise a MAC header 1101, a frame body 1114, an FCS. The MAC header 1101 may comprise a frame control field 1102 and other MAC header fields 1112. The frame control field 1102 may comprise a protocol version field 1104, a type field 1106, a subtype field 1108, a short frame extension 1109, and other frame control bits 1110. The protocol version field 1104 may be two bits in length (B0-B1) and may be invariant in size and in placement. The value of the protocol version field 1104 may represent the revision of the corresponding standard that the frame represents. The revision level will be incremented when a fundamental incompatibility exists between a new revision and the prior edition protocol version so MAC sublayer logic such as the MAC sublayer logic 1038 that receives a frame with a higher revision level than it supports shall discard the frame. Reception by the MAC sublayer logic such as the MAC sublayer logic 1038 of communications device 1030 implies that the frame contents are valid, and that the protocol version field 1104 value is supported, with no implication regarding frame addressing or regarding whether the frame type or other fields in the MAC header are meaningful to the MAC sublayer logic that has received the frame.

The type field 1106 may be two bits in length (B2-B3) and may identify the type of short frame 1100 as, e.g., an extension type. The subtype field 1108 may be four bits in length (B4-B7) and may identify the subtype of the short frame 1100 as, e.g., a management frame, a data frame, or a control frame. The short frame extension field 1109 may be four bits in length (B8-B11) and may identify the particular type of management frame, data frame, or control frame such as the type, subtype, and short frame extension values shown in FIGS. 1D-E in tables 1200 and 1300.

After the short frame extension field 1109 may be four bits in length (B12-B15) that may be used for additional frame control field parameters. The MAC header 1101 may also comprise other MAC header fields 1110 and the short frame 1100 may end with an FCS 1116.

Referring now to FIGS. 1D and 1E, there are shown tables 1200 and 1300 indicating the type and subtype values as well as the short frame extension values for the short frames such as the short data frames illustrated in FIGS. 1A-C. Note that the values shown are for illustrative purposes and may be any values that meet the length requirements of the type and subtype fields 1106 and 1108 and the short frame extension fields or other length requirements as defined in other embodiments.

Figure 2:
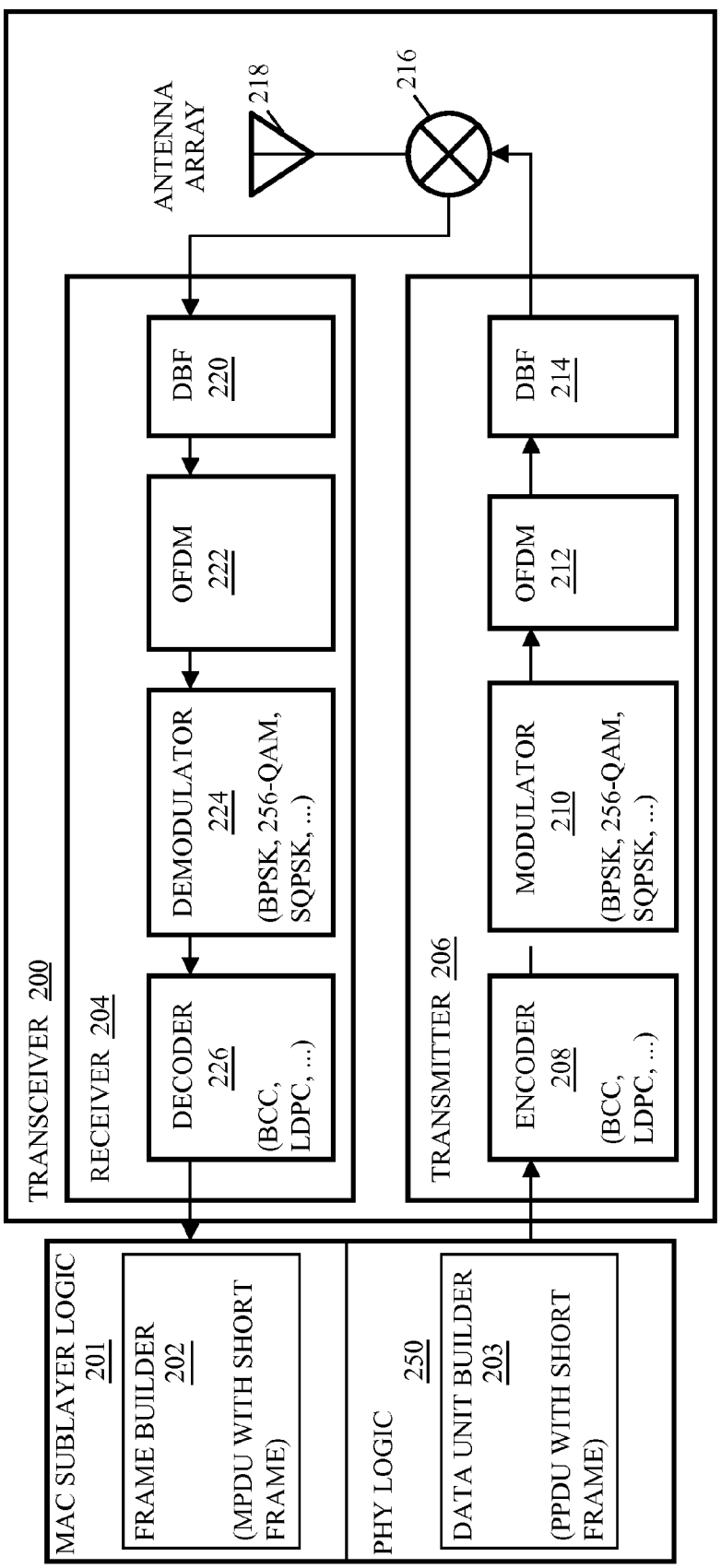
FIG. 2 depicts an embodiment of an apparatus to generate, transmit, receive and interpret a short frame with a short frame extension.

FIG. 2 depicts an embodiment of an apparatus to generate, transmit, receive, and interpret a device profile index element in a frame. The apparatus comprises a transceiver 200 coupled with Medium Access Control (MAC) sublayer logic 201. The MAC sublayer logic 201 may determine a frame and the physical layer (PHY) logic 250 may determine the PPDU by encapsulating the frame with a preamble to transmit via transceiver 200.

In many embodiments, the MAC sublayer logic 201 may comprise a frame builder 202 to generate frames (MPDU) such as one of the short frames illustrated in FIGS. 1A-C. The short frames may comprise data indicative of an extension type such as 11; a subtype indicative of a type of extension frame such as a management frame (e.g., 0010), a data frame (e.g., 0011), or a control frame (e.g., 0100); and a short frame extension indicative of a particular type of management frame, data frame, or control frame (e.g., 0100). The short frame formats, field values, and/or the short frames may be maintained by an access point such as communications device 1010 and a station such as communications device 1030 in FIG. 1. For example, in some embodiments, a frame builder 202 may generate a frame including a short extension field in the MAC header. In some embodiments, the frame builder 202 may generate a short extension field in the duration field of the MAC header. And in some embodiments, the frame builder 202 may generate a short extension field in the frame control field of the MAC header.

The PHY logic 250 may comprise a data unit builder 203. The data unit builder 203 may determine a preamble to encapsulate the MPDU to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU to determine the particular type of frame by determining the type value, the subtype value, and the short frame extension value. The MAC sublayer logic 201 may then utilize the frame body of the short frame in accordance with the particular type of frame. For instance, if the short frame is a short management frame, the frame body may include parameters to set for communication preferences for the source station of the transmission. In some embodiments, the frame body may include information related to traffic preferences such as traffic for which the source station requests that the access point respond on behalf of the source station.

Figure 3:
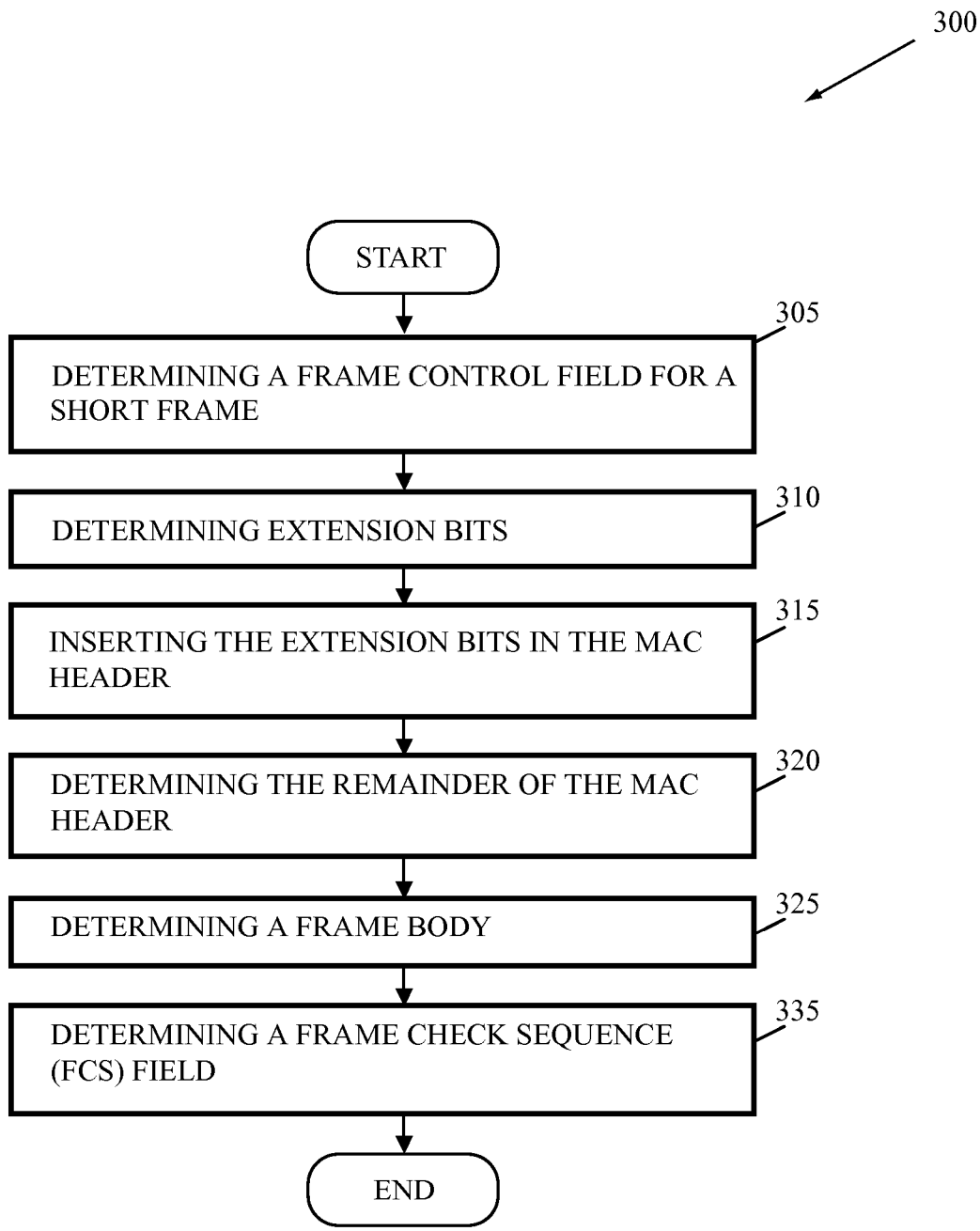
FIG. 3 depicts an embodiment of a flowchart to generate a short frame.

FIG. 3 depicts an embodiment of a flowchart 300 to generate or otherwise determine a short frame. The flowchart 300 begins with a medium access control (MAC) sublayer logic determining a frame control field for a short frame (element 305). In some embodiments, the MAC sublayer logic may determine a protocol version field to be the current revision of the standard, a type being an extension frame such as a value of 11, a subtype being a type of short frame such as a value of 0011 for a data frame, and other information.

The MAC sublayer logic may determine a short frame extension field value (element 310) and the MAC sublayer logic may insert the short frame extension field value in the MAC header (element 315). In some embodiments, the short frame extension field value may be inserted as, e.g., four bits, in the frame control field such as the frame control field 1102 of short frame 1100 illustrated in FIG. 1C. In further embodiments, the short frame extension field value may be inserted as, e.g., four bits, in the duration field or AID field such as the short frame extension field 1088 illustrated in FIG. 1B. In such embodiments, the MAC sublayer logic may also determine a truncated duration value by, e.g., utilizing a duration time unit that is greater than one microsecond or determine an AID by, e.g., hashing the AID or otherwise compressing the AID in a manner that can be decoded by the receiving communications device. In other embodiments, the short frame extension field value may be inserted as, e.g., four bits, in a separate field in the MAC header such as the frame control field 1062 illustrated in FIG. 1A.

The MAC sublayer logic may determine the remainder of the short frame (element 320). For example, the MAC sublayer logic may generate the remainder of the frame control field and the remainder of the MAC header such as a power management field value, a protected frame field value, an order field value, a more data field value, and/or the like.

The MAC sublayer logic may determine the frame body (element 325). In many embodiments, determining the fields may comprise retrieving these fields from a storage medium for inclusion in a frame. In other embodiments, the values to include in such fields may be stored in a storage medium such as a read only memory, random access memory, a cache, a buffer, a register, or the like. In further embodiments, one or more of the fields may be hardcoded into the MAC sublayer logic, PHY logic, or may otherwise be available for insertion into a frame. In still other embodiments, the MAC sublayer logic may generate the values of the fields of the short beacon frame based upon access to indications of the values for each.

After determining the other portions of the short frame, the MAC sublayer logic may determine a frame check sequence (FCS) field value (element 335) to provide for error corrections at the access point.

Figures 4A, 4B:
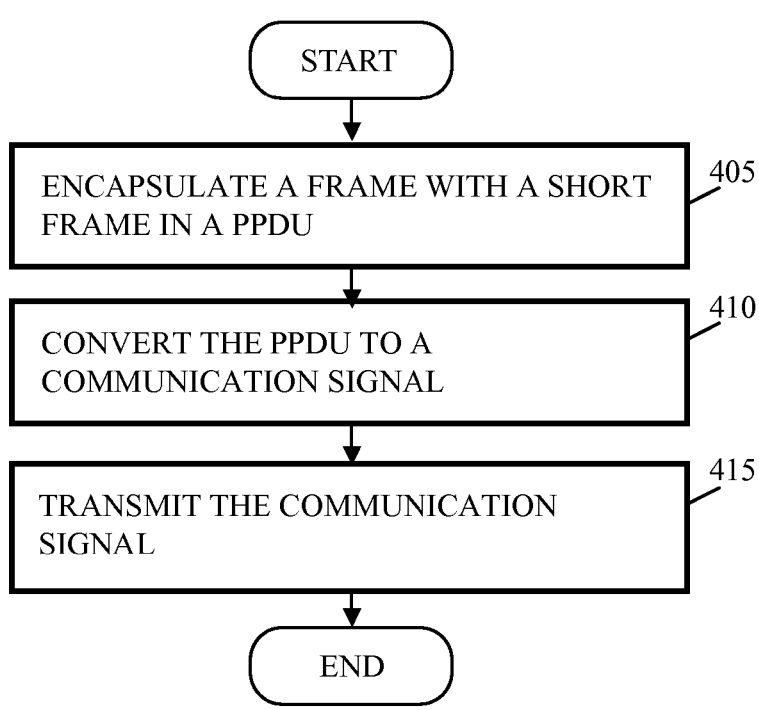
FIGS. 4A-B depict embodiments of flowcharts to transmit, receive, and interpret communications with short frames as illustrated in FIG. 2.

FIGS. 4A-B depict embodiments of flowcharts 400 and 450 to transmit, receive, and interpret communications with a short frame as the short frames illustrated in FIGS. 1A-C. Referring to FIG. 4A, the flowchart 400 may begin with receiving a frame from the frame builder comprising a short frame control field indicative of an extension type and an extension frame type such as a management frame, a data frame, or a control frame. The MAC sublayer logic of the communications device may generate the frame as a management frame to transmit to an access point and may pass the frame as an MPDU to a data unit builder that transforms the data into a packet that can be transmitted to the access point. The data unit builder may generate a preamble to encapsulate the PSDU (the MPDU from the frame builder) to form a PPDU for transmission (element 405). In some embodiments, more than one MPDU may be encapsulated in a PPDU.

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of an access point such as the receiver 204 in FIG. 2 receiving a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine short frame field values from the MPDU (element 470) such as the short frame 1060 fields, the short frame 1080 fields, or the short frame 1100 fields in FIGS. 1A-C. For instance, the MAC sublayer logic may determine short frame field values such as the type, subtype, and short frame extension field values of the short frame.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements to communicate with another communications device via short frames. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
  generating, by a medium access control (MAC) sublayer logic of a first device, a short frame comprising a MAC header with a number of fields each having various lengths and a frame body, wherein the MAC header comprises a frame control field, a short frame extension field, and one or more other MAC header fields, wherein the frame control field comprises a type field and a subtype field, wherein the type field comprises a value to identify the frame as an extension type frame and the subtype field comprises a value to identify the frame as a short management, data, or control type frame, wherein the short frame extension field comprises a value to identify a particular sub-type of short management, data, or control type frame; and
  creating, by a physical layer logic of the first device, a physical layer protocol data unit comprising the short frame encapsulated with a preamble based on parameters for transmission to a second device to facilitate wireless communications of the frame body in accordance with the particular sub-type of the short management, data or control type frame.

2. The method of claim 1, wherein generating the frame comprises generating the frame with the frame control field comprising the short extension field in the MAC header after the frame control field.

3. The method of claim 1, wherein generating the frame comprises generating the frame with the frame control field comprising the short extension field in a duration field or association identifier field.

4. The method of claim 1, wherein generating the frame with the frame control field comprising the short extension field in the frame control field.

5. A first device comprising:
  a memory;
  a medium access control (MAC) sublayer logic coupled with the memory to generate a short frame comprising a MAC header with a number of fields each having various lengths and a frame body, wherein the MAC header comprises a frame control field, a short frame extension field, and one or more other MAC header fields, wherein the frame control field comprises a type field and a subtype field, wherein the type field comprises a value to identify the frame as an extension type frame and the subtype field comprises a value to identify the frame as a short management, data, or control type frame, wherein the short frame extension field comprises a value to identify a particular sub-type of short management, data, or control type frame; and
  a physical layer logic coupled to the MAC sublayer logic to create a physical layer protocol data unit comprising the short frame and encapsulated with a preamble based on parameters for transmission to a second device to facilitate wireless communications of the frame body in accordance with the particular sub-type of the short management, data or control type frame.

6. The device of claim 5, wherein the MAC sublayer logic is coupled with the memory to store at least a portion of the frame.

7. The device of claim 5, wherein the MAC sublayer logic comprises logic to generate the frame comprising the short extension field in the MAC header after the frame control field.

8. The device of claim 5, wherein the logic comprises logic to generate the frame comprising the short extension field in a duration field.

9. The device of claim 5, wherein the MAC sublayer logic comprises logic to generate the frame comprising the short extension field in the frame control field.

10. A method comprising:
receiving, by a medium access control (MAC) sublayer logic of a first device, a physical layer protocol data unit from a second device comprising a short frame encapsulated with a preamble based on parameters for transmission, the short frame comprising a MAC header with a number of fields each having various lengths and a frame body, wherein the MAC header comprises a frame control field, a short frame extension field, and one or more other MAC header fields, wherein the frame control field comprises a type field and a subtype field, wherein the type field comprises a value to identify the frame as an extension type frame and the subtype field comprises a value to identify the frame as a short management, data, or control type frame, wherein the short frame extension field comprises a value to identify a particular sub-type of short management, data, or control type frame; and
utilizing, by the medium access control sublayer logic, the frame body based upon the particular sub-type of the short management, data, or control type frame to facilitate wireless communications with the second device.

11. The method of claim 10, further comprising storing, by the MAC sublayer logic, at least part of the frame in memory.

12. The method of claim 10, wherein determining the particular type of management, data, or control frame based upon the value in the short extension field comprises determining the value in the short extension field from a value in the duration field.

13. The method of claim 10, wherein determining the particular type of management, data, or control frame based upon the value in the short extension field comprises determining the value in the short extension field from the frame control field.

14. A first device comprising:
a memory;
a medium access control (MAC) sublayer logic coupled with the memory to:
receive a physical layer protocol data unit from a second device comprising a short frame encapsulated with a preamble based on parameters for transmission, the short frame comprising a MAC header with a number of fields each having various lengths and a frame body, wherein the MAC header comprises a frame control field, a short frame extension field, and one or more other MAC header fields, wherein the frame control field comprises a type field and a subtype field, wherein the type field comprises a value to identify the frame as an extension type frame and the subtype field comprises a value to identify the frame as a short management, data, or control type frame, wherein the short frame extension field comprises a value to identify a particular sub-type of short management, data, or control type frame; and
utilize the frame body based upon the particular sub-type of the short management, data, or control type frame to facilitate wireless communications with the second device.

15. The device of claim 14, further comprising a transmitter coupled with the MAC sublayer logic to transmit the frame.

16. The device of claim 15, further comprising an antenna coupled with the transmitter to transmit the frame.

17. The device of claim 14, wherein the MAC sublayer logic comprises logic to determine the particular type of management, data, or control frame based upon the value in the short extension field comprises determining the value in the short extension field from a value in the duration field.

18. The device of claim 14, wherein the MAC sublayer logic comprises logic to determine the particular type of management, data, or control frame based upon the value in the short extension field comprises determining the value in the short extension field from the frame control field.

19. A machine-accessible product comprising:
a non-transitory medium containing instructions to cause a machine to perform operations, wherein the operations comprise:
generating, by a medium access control sublayer logic of a first device, a short frame with a number of fields each having various lengths comprising a MAC header and a frame body, wherein the MAC header comprises a frame control field, a short frame extension field, and one or more other MAC header fields, wherein the frame control field comprises a type field and a subtype field, wherein the type field comprises a value to identify the frame as an extension type frame and the subtype field comprises a value to identify the frame as a short management, data, or control type frame, wherein the short frame extension field comprises a value to identify a particular sub-type of short management, data, or control type frame; and
creating, by a physical layer logic of the first device, a physical layer protocol data unit comprising the short frame encapsulated with a preamble based on parameters for transmission to a second device to facilitate wireless communications of the frame body in accordance with the particular sub-type of the short management, data or control type frame.

20. The machine accessible product of claim 19, wherein generating the frame comprises generating the frame comprising the short extension field in the MAC header after the frame control field.

21. The machine accessible product of claim 19, wherein generating the frame comprises generating the frame comprising the short extension field in the frame control field.

* * * * *